March 8, 1938.  H. E. DOERR  2,110,357
WHEEL
Filed June 26, 1933  2 Sheets-Sheet 1
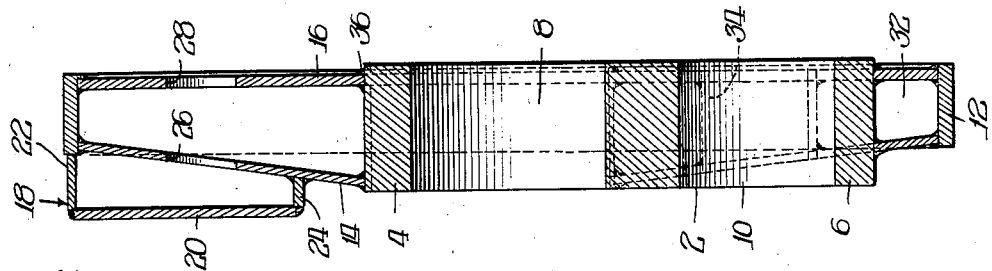
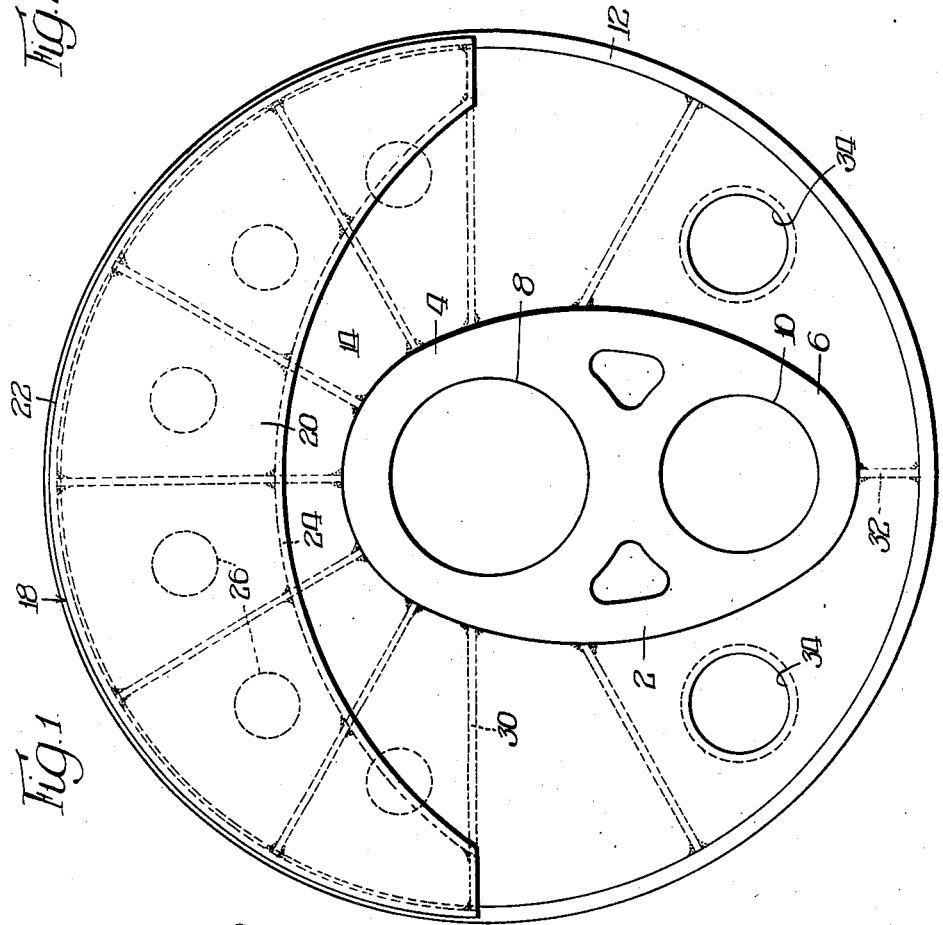
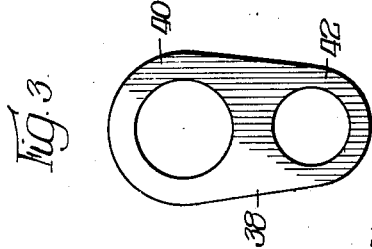
Inventor:
Harry E Doerr,
By Wilkinson, Huxley, Byron & Knight
Attys.

March 8, 1938.  H. E. DOERR  2,110,357
WHEEL
Filed June 26, 1933  2 Sheets-Sheet 2
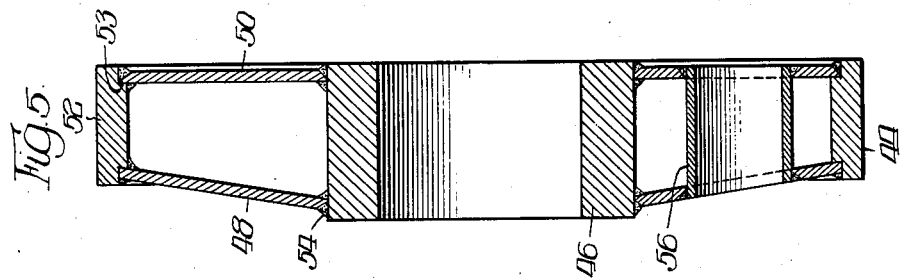
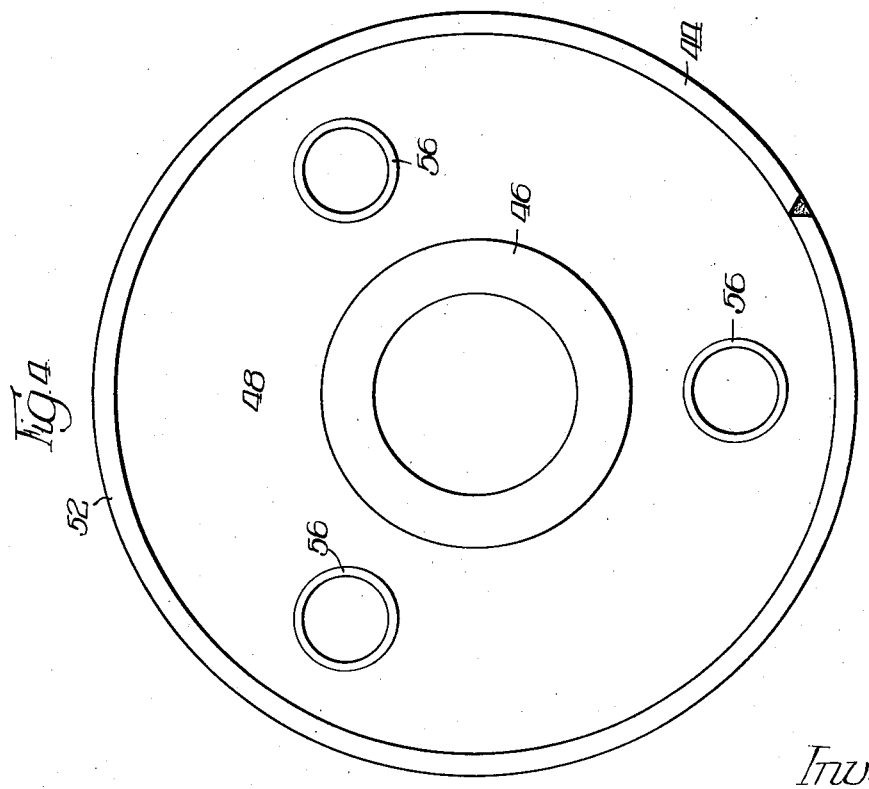
Inventor:
Harry E. Doerr,
By Wilkinson Huxley Byron & Knight
Attys Patented Mar. 8, 1938

2,110,357

UNITED STATES PATENT OFFICE 2,110,357

WHEEL

Harry E. Doerr, St. Louis, Mo.

Application June 26, 1933, Serial No. 677,557

23 Claims. (Cl. 295—1)

The present invention relates to car wheels, and more in particular to locomotive drive wheels or drive wheel centers.

At the present time car wheels, as well as locomotive drive wheels and centers, are being constructed to include spaced webs extending between the hub and rim portions thereof. These wheels are of cast construction and are far superior to the well-known spoke type of wheel in that the same are substantially lighter in weight and are of increased strength as compared to that type of wheel. It has been found, however, that a cast wheel of this type has certain disadvantages in that the various metal sections must be of certain thickness to permit casting thereof, thereby decreasing the amount of weight which can be counterbalanced with a wheel of this kind. Furthermore, wheels of this kind must necessarily be constructed and fabricated at a central plant specially equipped for molding the same.

It is therefore an object of the present invention to provide a novel car wheel wherein the various parts thereof are separately formed and fabricated and built up into a completed car wheel. Because of this built-up construction, the various parts of the car wheel may be of rolled sections which may be of thinner sections than corresponding parts of a cast wheel of this type, yet maintaining necessary structural requirements. A wheel of this kind is therefore lighter in weight and consequently more weight can be counterbalanced than with a corresponding cast wheel. Still further, this built-up construction is advantageous to the small concerns having only a very small amount of equipment, as well as capital, in that the necessary parts may be cut to the desired shape and form and connected together as desired.

The present invention comprehends the idea of providing a built-up wheel of the spaced disc or web type wherein the various parts are cut from rolled sections and secured together as by means of welding or the like.

The present invention likewise comprehends a disc type car wheel of built-up construction, wherein the hub may be either cast or cut from the desired rolled plate and wherein the remaining parts of the wheel are separately formed from rolled members, the same being connected together as by means of welding or the like to form the finished wheel.

Other objects, features, capabilities and advantages are comprehended by the invention, as will later appear and as are inherently possessed thereby.

Referring to the drawings:

Figure 1 is a view in elevation of a car wheel made in accordance with the present invention;

Figure 2 is a view in cross-section taken through the car wheel shown in Figure 1 of the drawings;

Figure 3 is a view in elevation of one of the parts of a car wheel made in accordance with the present invention and somewhat modified from the corresponding part shown in Figures 1 and 2 of the drawings;

Figure 4 is a view in elevation of a modified form of car wheel; and

Figure 5 is a view in cross-section through the wheel of Figure 4 of the drawings.

Referring now more in detail to the drawings, an embodiment selected to illustrate the present invention is shown in connection with a locomotive drive wheel or center, and comprises a hub 2 including a main hub portion 4 and a crank pin hub portion 6, these hub portions being provided with openings 8 and 10, respectively, to receive the main and crank pins. This wheel further includes a rim portion 12 between which and the hub 2 extend discs or webs 14 and 16. Adjacent one portion of the rim 12 is a counterbalance pocket 18 which is formed with a front wall 20 and top and bottom walls 22 and 24, respectively. This counterbalance pocket 18 is disposed adjacent the web 14, and the wall 22 is connected to the rim 12, while the wall 24 is connected to the web 14. In order to fill this counterbalance pocket 18 with suitable counterbalancing material, the webs 14 and 16 are provided with substantially aligned openings 26 and 28, respectively, through which this counterbalance material may be introduced into the pocket. It will be noted that the central hub 2 is non-circular and eccentrically disposed with respect to the axis of the wheel and thereby causes thrust to be transmitted to or from the rim 12 by butting action against the plates or webs 14 and 16 rather than by shear along the line of welding.

The webs 14 and 16 are reinforced and strengthened by means of a plurality of spaced reinforcing webs or spacers 30 which extend from the main hub portion outwardly to the rim 12, the openings 26 and 28 of the webs 14 and 16 being disposed at the counterbalance portion between adjacent separators or reinforcing webs 30. The webs 14 and 16 between the crank pin hub portion 6 and rim 12 are reinforced by means of a separator or reinforcing web 32 extending therebetween, as disclosed.

Adjacent to and on opposite sides of the crank pin hub portion 2, the webs or discs 14 and 16 are provided with substantially aligned enlarged openings, within each of which is disposed a hollow tubular separator or member 34 which not only is adapted to reinforce these webs at those points, but likewise provides openings for the removal of pins associated with the driving mechanism for this locomotive drive wheel. These members likewise prevent accumulation of waste matter between the discs of the wheel.

As clearly pointed out above, the locomotive drive wheel center disclosed in Figures 1 and 2 comprises a hub portion 2, rim 12, spaced discs or webs 14 and 16, separators 30 and 32, counterbalance pocket 18 and tubular members 34. In the present embodiment, the hub 2 is of cast construction, while the remaining portions or parts of the wheel are of rolled sections. The rim may be made of a steel casting, if desired, and machined in the form of a ring, or it may be made of a rolled bar and formed into a circular band. The discs 14 and 16 are formed from the required rolled plates and cut to the desired shape, while the counterbalance pocket 18 comprises walls cut from rolled plates and secured together. As clearly disclosed in the drawings, these various parts of the wheel are welded together at their junction with adjacent parts as by means of welding, as indicated by reference numeral 36.

If desired, the wheel may be entirely formed of rolled sections, and the parts connected together as by means of welding, as previously indicated. Figure 3 discloses a hub 38 comprising a main hub portion 40 and a crank pin hub portion 42, this hub member 38 being cut with an oxygraph from a billet and then connected by means of welding to adjacent members of the wheel construction in order to provide a finished wheel.

From the above it will be clearly apparent that this type of built-up wheel has advantages over a corresponding type of cast wheel in that the various parts thereof may be formed or built up from rolled plates which are of less thickness than corresponding cast portions of a cast wheel, thereby making the wheel as a whole lighter than a corresponding cast wheel, and in consequence thereof a greater amount of weight can be counter-balanced than with the cast wheel. This type of wheel is equally as strong as the corresponding cast type of wheel, and it will be noted that the webs or discs 14 and 16 are so disposed between the rim and hub portion as to act as a truss. In other words, the disc or web 16 is substantially normal to the rim and hub, while the disc or web 14 extends from adjacent the outer edge of the rim 12 angularly relative to the web or disc 16 and is connected adjacent the outer edge of the hub 2. These discs or webs therefore act as a truss for supporting the rim and for transfer of forces between the rim and hub portions.

Although the present invention has been disclosed in connection with a built-up locomotive drive wheel center, it is to be understood that the same is of such a scope as to comprehend various types of built-up wheel constructions, and it is of course understood that the term "wheel," as used in the specification and claims, is sufficiently broad to include a wheel whether the same be for a locomotive or otherwise, whether the same be in the form of a center to which is secured a flange tread, or whether the tread is constructed integral with the remaining portions of the wheel. This term "wheel" is likewise to be construed sufficiently broad to cover a car wheel having a hub and rim with spaced discs or webs extending therebetween.

Another advantage of the present type of wheel as disclosed is that these wheels may be manufactured by various small concerns with a very small outlay of capital, as very little equipment would be required. In order to construct these wheels it would only be necessary to secure the necessary plates and cut them to the desired shape with an oxy-acetylene torch, form them as disclosed, and weld them in place to provide a finished wheel, and this could be done without involving a large outlay of capital in the form of plant equipment which would be necessary to construct cast wheels.

As disclosed in Figures 4 and 5 of the drawings, the present invention is further embodied in a car wheel 44 which merely includes a single main hub 46, spaced webs 48 and 50, and a rim 52. The rim 52 is provided with shoulders 53 to receive webs or discs 48 and 50, this rim being adapted to receive a flanged tread shrunk or otherwise fitted thereto to provide a finished wheel adapted for use on cars or as trailer wheels for locomotives and the like. The spaced webs, hub and rim portion of this embodiment are secured together in accordance with the hereinbefore disclosed embodiment shown in Figures 1 to 3 inclusive of the drawings, as by means of welding or the like 54, this type of construction providing a built-up wheel which may be readily fabricated and assembled. At spaced intervals the webs 48 and 50 are formed with substantially aligned openings disposed within which are tubular members 56 welded to the spaced webs 48 and 50 to provide reinforcing members for the wheel and to prevent ingress of foreign material into the space between these webs. A car wheel made in accordance with the disclosure in Figures 4 and 5 of the drawings has the inherent advantages of the present invention in that the parts thereof may be formed separately and connected together to form the built-up finished wheel. It is of course understood that the various parts of this car wheel may be formed from suitable material in accordance with the hereinbefore disclosed embodiment.

While I have herein described and upon the drawings shown illustrative embodiments of the present invention, it is to be understood that the invention is not limited thereto but may comprehend other constructions, arrangements of parts, details and features without departing from the spirit of the invention.

I claim:

1. A locomotive wheel comprising a hub including main and crank pin hub portions, a rim, and spaced webs extending between said hub and rim, said webs being in spaced relation throughout their entire width, said hub being non-circular and eccentrically disposed with respect to the axis of the wheel whereby thrust is transmitted to or from the rim by butting action of said rim and hub against the entire inner and outer periphery of said webs, said parts being formed separately and being welded together at the points of abutment of said webs with said hub and rim to form said wheel.

2. A built-up locomotive wheel center comprising a hub including main and crank pin hub portions, a rim, spaced webs extending between said hub and rim and connected thereto in spaced relation, one of said webs being frusto-conical shaped and the other of said webs being disposed in a plane, said hub being non-circular and eccentrically disposed with respect to the axis of the wheel whereby thrust is transmitted to or from the rim by butting action against said webs, and reinforcing members between said webs, said parts being formed separately and connected together to form said wheel.

3. A built-up locomotive wheel comprising a hub including main and crank pin hub portions, a rim, rim supporting and load carrying means between said hub and rim, and a counterbalance pocket exteriorly of said means, said parts being connected together to form said wheel.

4. A built-up locomotive wheel comprising a hub including main and crank pin hub portions, a rim, spaced webs extending between said hub and rim, and a counterbalance pocket associated with one of said webs exteriorly thereof, said parts being connected together to form said wheel.

5. A built-up locomotive wheel comprising a hub including main and crank pin hub portions, a rim, spaced webs extending between said hub and rim, and a counterbalance pocket associated with one of said webs exteriorly thereof, said parts being welded together to form said wheel.

6. In a wheel, the combination of a rim, a hub, spaced webs connected thereto, and a counterbalance pocket connected exteriorly of one of said webs, said webs having substantially aligned openings whereby counterbalancing material may be introduced into said pocket.

7. A wheel comprising a hub, a rim, spaced webs extending therebetween, a counterbalance pocket connected to said wheel exteriorly of one of said webs, and reinforcing webs between said first-named webs adjacent said counterbalance pocket, said first-named webs having substantially aligned openings between adjacent reinforcing webs whereby counterbalancing material may be introduced into said pocket.

8. A built-up locomotive wheel center comprising a hub including main and crank pin hub portions, a rim, spaced webs extending between said rim and hub, a counterbalance pocket secured to said wheel exteriorly of one of said webs, said webs having substantially aligned openings in opposite relation to said pocket whereby counterbalancing material may be introduced into said pocket, spaced reinforcing webs between said first-named webs and extending between said hub and rim, said first-named webs having aligned openings disposed adjacent to and on opposite sides of said crank pin hub portion, tubular members extending between said webs adjacent said openings to provide for removal of driving elements associated with said wheel, said parts being welded together in proper position to form a finished wheel.

9. A built-up wheel center comprising a hub, a rim, spaced webs extending between said hub and rim, one of said webs being frusto-conical shaped and the other of said webs being disposed in a plane, said hub being non-circular and eccentrically disposed with respect to the axis of the wheel whereby thrust is transmitted to or from the rim by butting action against said webs, a reinforcing tubular member extending between said webs, said parts being formed separately and connected together to form the finished wheel.

10. A built-up wheel center comprising a hub, a rim, spaced webs extending between said hub and rim, one of said webs being frusto-conical shaped and the other of said webs being disposed in a plane, said hub being non-circular and eccentrically disposed with respect to the axis of the wheel whereby thrust is transmitted to or from the rim by butting action against said webs, said webs being imperforate except for aligned openings, and a reinforcing member extending between and connected to said webs at the openings, said parts being formed separately and connected together to form the finished wheel.

11. A built-up wheel center comprising a hub, a rim, spaced webs extending between said hub and rim, one of said webs being frusto-conical shaped and the other of said webs being disposed in a plane, said hub being non-circular and eccentrically disposed with respect to the axis of the wheel whereby thrust is transmitted to or from the rim by butting action against said webs, said webs being imperforate except for a plurality of aligned openings, and a reinforcing tubular member extending between and connected to said webs at each of the aligned openings, said parts being formed separately and connected together to form the finished wheel.

12. A built-up locomotive wheel comprising a hub having main and crank pin hub portions, a rim, spaced webs and a counterbalance, said hub being non-circular and eccentrically disposed with respect to the axis of the wheel whereby thrust is transmitted to or from the rim by butting action of said rim and hubs against said webs, said parts being formed separately and connected together to form an assembled wheel, said counterbalance where connected to said wheel forming a pocket with and exteriorly of one of said webs.

13. A built-up locomotive wheel comprising a hub including main and crank pin hub portions, a rim, spaced webs disposed between said hub and rim, said hub being non-circular and eccentrically disposed with respect to the axis of the wheel whereby thrust is transmitted to or from the rim by butting action against said webs, a counterbalance disposed adjacent said rim in opposite relation to said crank pin hub portion, said webs being spaced apart throughout their entire width and being imperforate except for aligned openings, and a reinforcing member connected to said webs at said openings, said parts being formed separately and connected together to form the finished wheel, said counterbalance when connected to said wheel forming a pocket with one of said webs.

14. A built-up locomotive wheel comprising a hub including main and crank pin hub portions, a rim, spaced webs disposed between said hub and rim, said hub being non-circular and eccentrically disposed with respect to the axis of the wheel whereby thrust is transmitted to or from the rim by butting action against said webs, a counterbalance disposed adjacent said rim in opposite relation to said crank pin hub portion, said webs being connected to said hub and rim in spaced relation and being imperforate except for aligned openings, and a reinforcing member connected to said webs at said openings, said parts being formed separately and connected together to form the finished wheel, said counterbalance when connected to said wheel forming a pocket with one of said webs.

15. A built-up locomotive wheel comprising a hub including main and crank pin hub portions, a rim, spaced webs disposed between said hub and rim, said hub being non-circular and eccentrically disposed with respect to the axis of the wheel whereby thrust is transmitted to or from the rim by butting action against said webs, a counterbalance disposed adjacent said rim in opposite relation to said crank pin hub portion, said webs being connected to said hub and rim in spaced relation and being imperforate except for a plurality of aligned openings, and a reinforcing tubular member extending between and connected to said webs at each of the aligned openings, said parts being formed separately and connected together to form the finished wheel, said counterbalance when connected to said wheel forming a pocket with one of said webs.

16. A built-up locomotive wheel comprising a hub including main and crank pin hub portions, a rim, spaced webs disposed between said hub and rim, said hub being non-circular and eccentrically disposed with respect to the axis of the wheel whereby thrust is transmitted to or from the rim by butting action against said webs, a counterbalance disposed adjacent said rim in opposite relation to said crank pin hub portion, said webs being connected to said hub in spaced relation and being imperforate except for a plurality of aligned openings, and a reinforcing tubular member extending between and connected to said webs at each of the aligned openings, said parts being formed separately and connected together to form the finished wheel, said counterbalance when connected to said wheel forming a pocket with one of said webs.

17. A built-up locomotive wheel comprising a hub including main and crank pin hub portions, a counterbalance, a rim, and a web disposed between said hub and rim, said hub being non-circular and eccentrically disposed with respect to the axis of the wheel whereby thrust is transmitted to or from the rim by butting action of said rim and hub against the entire inner and outer periphery of said web, said parts being connected together to form said wheel, said counterbalance when connected to said wheel forming a pocket with said web.

18. A built-up locomotive wheel comprising a main hub, a crank pin hub, a rim, a counterbalance, rim supporting and load carrying means between said hub and rim, said main hub being concentrically disposed with respect to said rim and said crank pin hub being eccentrically disposed with respect to said main hub, and means connecting said hubs whereby thrust is transmitted to or from the rim by butting action against said load carrying means around the entire inner periphery of said rim and the entire outer periphery of said hubs, parts of said wheel being formed separately and being welded together to form said wheel.

19. A built-up locomotive wheel center comprising a hub including main and crank pin hub portions, a rim, and spaced webs extending between and being disposed in abutting relation to said rim and hub whereby thrust is transferred to or from said hub and rim by butting action, said parts being formed separately and welded together at the points of abutment of said webs with said hub and rim, and a counterbalance welded to said wheel to form a counterbalance pocket with and exteriorly of one of said webs.

20. A built-up locomotive wheel comprising a hub including main and crank pin hub portions, a rim, a counterbalance pocket, a web extending from said rim to said hub, and a web spaced from said first-named web and extending from said rim to said hub, said hub being non-circular and eccentrically disposed with respect to the axis of the wheel and abutting said webs for transmitting thrust to or from the entire rim by butting action against said webs, said counterbalance pocket being formed in part by said second-named web, certain of the parts of said wheel being formed separately and being welded together to form the same.

21. A built-up locomotive wheel comprising a hub including main and crank pin hub portions, a rim, a counterbalance pocket, spaced webs extending from said rim to said hub, said hub being non-circular and eccentrically disposed with respect to the axis of the wheel, each of said spaced webs having an opening fitting said hub whereby said hub abuts said webs for transmitting thrust to or from the entire rim by butting action against said webs, said counterbalance pocket being formed in part by one of said webs, certain of the parts of said wheel being formed separately and being welded together to form the same.

22. A built-up locomotive wheel comprising a hub including main and crank pin hub portions, a rim, a counterbalance pocket, a web extending from said rim to said hub, and a web spaced from said first-named web and extending from said rim to said hub, said hub being non-circular and eccentrically disposed with respect to the axis of the wheel and abutting said webs for transmitting thrust to or from the entire rim by butting action against said webs, said abutting relation being continuous at least over a portion of said main hub portion adjacent said counterbalance pocket, said counterbalance pocket being formed in part by said second-named web, certain of the parts of said wheel being formed separately and being welded together to form the same.

23. A built-up locomotive wheel comprising a hub including main and crank pin hub portions, a rim, a counterbalance pocket, a web extending from said rim to said hub, and a web spaced from said first-named web and extending from said rim to said hub, said hub being non-circular and eccentrically disposed with respect to the axis of the wheel and abutting said webs for transmitting thrust to or from the entire rim by butting action against said webs, said abutting relation being continuous around the periphery of said hub, said counterbalance pocket being formed in part by said second-named web, certain of the parts of said wheel being formed separately and being welded together to form the same.

HARRY E. DOERR.